US006429398B1

(12) United States Patent
Legoupil et al.

(10) Patent No.: US 6,429,398 B1
(45) Date of Patent: Aug. 6, 2002

(54) FLASH WELDING INSTALLATION

(75) Inventors: Jean-Luc Legoupil, Paris; Pascal Gobez, Garches, both of (FR)

(73) Assignee: Vau Clecim, Courbevoie (FR)

( * ) Notice: Subject to any disclaimer, the term of this patent is extended or adjusted under 35 U.S.C. 154(b) by 0 days.

(21) Appl. No.: 09/599,020

(22) Filed: Jun. 22, 2000

(30) Foreign Application Priority Data

Jun. 23, 1999 (FR) .............................. 99 08032

(51) Int. Cl.$^7$ ................................ B23K 11/04
(52) U.S. Cl. ........................... 219/97; 219/108
(58) Field of Search ............. 219/97, 101, 102

(56) References Cited

U.S. PATENT DOCUMENTS

| 3,484,578 | A | * | 12/1969 | Sciaky | .................. | 219/97 |
| 3,771,215 | A | | 11/1973 | Williams et al. | | |
| 4,354,089 | A | * | 10/1982 | Takahashi et al. | ............. | 219/97 |
| 5,698,118 | A | * | 12/1997 | Takeda et al. | ................. | 219/97 |
| 6,169,263 | B1 | * | 1/2001 | Derby, Jr. et al. | .......... | 219/101 |

FOREIGN PATENT DOCUMENTS

CH             469 525       4/1969

OTHER PUBLICATIONS

T. Saito and Y. Ichiyama, Weld Defects and Evaluation of Weld Quality: Welding Phenomena and Process Control in Flash Welding of Steel Sheets (1st Report) Feb. 1996.

* cited by examiner

Primary Examiner—Clifford C. Shaw
(74) Attorney, Agent, or Firm—Arent Fox Kintner Plotkin & Kahn

(57) ABSTRACT

The invention relates to an installation for welding metal bands comprising two retaining members (2, 2') for the ends of both bands, mounted respectively on a fixed frame (1) and a mobile frame (1'), means for shearing both facing parallel edges (*m*1, *m*2) on the ends of both bands (M1, M2) and electric power supply means (3) for flash butt welding of the said bands.

According to the invention, the electric power supply means of both bands comprise a direct current generator (3) connected to continuous modulation means (34) of the voltage applied between the retaining members (2, 2') in relation to the sizes of the bands (M1, M2) in transversal section and according to the nature of the metals to be welded.

11 Claims, 2 Drawing Sheets

FLASH WELDING INSTALLATION

The invention relates to a flash butt welding installation for metal bands passing successively along a longitudinal axis.

In metallurgical installations, in particular dedicated to the production of metal bands, bands must often be welded one after the other by electric welding, for example at the inlet of hot rolling band pickling facilities, at the inlet of continuous-continuous type cold roll mills and at the inlet of so-called 'coupled' facilities that perform pickling and cold rolling of sheets on a single line.

Generally, for continuous working, the downstream end must be welded, in the running direction, of a band whose processing is nearly finished, to the upstream end of the following band. The welding is then made along a transversal line, generally perpendicular to the running axis.

Various means are used to this end. For example, the ends of both bands can be applied one over the other and they can be welded by discharging electric current between two wheels running transversally.

But, in some cases, both bands must be butt-welded to avoid any excessive thickness. Both ends must therefore be shorn off, respectively downstream and upstream of both bands, then brought closer to one another so that the facing edges contact each other, in order to be flash welded.

Such a facility comprises hence various tools working in succession.

First of all, the ends, respectively downstream and upstream of the first and of the second bands are shorn by a cutting tool enabling to provide two edges, respectively upstream and downstream, at the ends of both bands that are fixed, during the shearing, by two retaining members.

Then, both shorn edges are brought close to one another and flash welded.

To this end, a welding facility comprising two pairs of clamping jaws is used, whereas the said jaws are mounted respectively on a fixed frame and on a mobile frame, movable longitudinally in order to bring both bands closer to one another, electric supply means creating a potential difference between the facing ends of both bands in order to weld them.

Moreover, the ends of the bands should preferably be applied one against the other under a certain pressure, to produce a forging effect of the welding.

However, the welding bead forms, on both faces of the band, burrs that must be removed so that the welded portion can travel through the various sections of the processing line. The machine comprises therefore usually a tool for burring and trimming the welded point, whereas the said tool consists most of the times of a grinding wheel or a trimmer fitted with knives that cut the burrs off, by moving transversally along the welded joint.

The machine must also be fitted with a number of appended devices, for example, one or several looker devices thereby providing a certain clearance of longitudinal displacement of each band without affecting the running means, centering means for perfect alignment of both bands, as well as a notched for removing the ends of the welded joint on the lateral edges of both bands, in particular when the said bands have not the same width.

To adjust the parallelism of the shorn edges and to determine their spacing in relation to the thickness of the bands to be welded, a spacing bar is often used, that is interposed between both edges that are applied on either side of this bar. These adjustments increase the duration of a welding operation and, moreover, call for the intervention of an operator.

Such installations are therefore rather complicated and require too much space, since the tools are used one after the other according to the order of operations to be performed.

Various arrangements have been proposed to simplify the operations and to perform them rapidly, with sufficient accuracy.

In particular, to reduce the number of manoeuvres, it has been suggested to perform all the operations without moving the bands, while using double shears built into the machine and performing simultaneously two perfectly parallel edges on both bands that remain clamped, throughout all the operations, between the jaws of both retaining members, respectively fixed and mobile.

For example, in the arrangement described in the document FR-A-2311626, double guillotine shears are used, interposed between the clamping jaws for cutting the ends of both bands simultaneously and then moved sideways to enable a welding tool to come forward, consisting of two sets of jaws forming power supply electrodes. These electrodes are installed, with the shears, on a frame that can move perpendicularly to the running axis of the band and that also carries a burring tool that, in a third position, flattens the welded joint.

Both these mobile electrodes are therefore power-supplied by contact with both retaining members, after longitudinal clamping of the assembly.

Generally speaking, the design of these electric circuits also raises numerous problems, considering the powers to be implemented, the space requirements of the tooling sets and the operating conditions.

For example, the sheets to be butt-welded being heated by a Joule effect, they must obviously be subjected to sufficient voltage to bring the required energy during the flash welding process and this voltage must be adjusted in relation to the sizes, thickness and width, of the sheets to be welded, whereas these sizes may, besides, vary according to the manufacturing programme.

However, it has been noted that the value of the supply voltage should also be limited in order to reduce the formation of oxides at the interface during the welding operations since these oxides tend to make the welded joint brittle.

Usually, the electrodes are supplied with alternate current using a transformer associated with means for setting the voltage applied.

A transformer capable of generating the necessary power is rather cumbersome and, in the arrangement of the document FR-A-2311626, it is located beneath the running plane of the bands, on a circulation track provided in the foundations. But consequently, the supply circuits and the isolation means of the electrodes can be damaged, during the shearing and welding operations, by falling chips, the projections of metal caused by the flash welding process and welding debris.

In order to remedy such shortcomings, it is possible to place the transformer above the running plane of the band according to an arrangement that has been divulged, for instance, in the document EP-A-0845309.

That document relates to a perfected welding machine that advantageously, with respect to the previous arrangement, does away with mobile electrodes, whereas the power required for welding is provided directly by the retaining members of both bands that are isolated with respect to the remainder of the machinery. Any contact resistance between the mobile electrodes and the clamping jaws is thereby avoided. Moreover, such a machine enables very accurate adjustment of the cantilever distances between the end of each clamping jaw and the corresponding shorn edge of the band.

Thanks to this arrangement, the circuits travelled by the current, notably because of their geometry, exhibit rather large impedance, which increases the power to be supplied for the welding process and, consequently, the voltage necessary to the flashing and the heating of the bands at a temperature enabling the welding and forging of the joint.

Still, we have seen that excessive voltage exhibits shortcomings and the installations used until now are therefore supplied with alternate current at low voltage, ranging for instance between 6 and 20 volts efficient. However, the voltage is adjusted by a terminal device that does not enable actual regulation of the welding realisation conditions. Moreover, this device must be motor-driven, that complicates the realisation of the transformer.

The invention relates to improvements made to the welding installations enabling to remedy all these shortcomings. In particular, the invention enables simplification of the tooling sets and better control of the welding process, while ensuring notably regular formation of sparks during the starting and flashing phases.

The invention therefore relates, generally speaking, to a welding installation of such type, for butt connection of metal bands running successively along a longitudinal axis, comprising a fixed frame centred on the running axis and on which is mounted a first two-jaw retaining member for clamping the downstream end, in the running direction, of a first band, a mobile frame centred on the running axis and movable parallel to the said axis with respect to the fixed frame, whereas the said mobile frame carries a second two-jaw retaining member for clamping the upstream end of a second band following the first one, means for shearing both facing parallel edges, respectively downstream and upstream, on the ends of both bands, after clamping the said bands respectively in the first and the second retaining members, whereby each edge is shorn at a preset cantilever distance with respect to the corresponding clamping jaws, means for controlling the displacement of the mobile frame toward the fixed frame in order to bring the edges of both bands closer to one another and electric power supply means with two poles connected respectively to the said bands for flash butt welding of the said bands.

According to the invention, the electric power supply means of both bands comprise a direct current generator connected to continuous modulation means of the voltage applied between the retaining members in relation to the sizes of the bands in transversal section and according to the nature of the metals to be welded.

Particularly advantageously, the direct current generator comprises a three-phase transformer whose primary circuits are supplied with three-phase alternate current and whose secondary circuits are connected, via a diode-rectifier bridge, to two supply poles to which are plugged respectively both band retaining members.

According to the preferred embodiment, the primary circuits of the three-phase transformer are connected respectively to the three phases of an alternate network via pulse-controlled thyristor devices synchronous with the alternate current in order to modulate the applied voltage.

Advantageously, the secondary circuits of the three-phase transformer are connected to both supply poles via a 'Graetz bridge' type six-phase rectifier bridge.

Thanks to these arrangements, it is possible to flash weld metal sheets whose thickness can range, for instance, from 0.8 mm to 8 mm and whose width may exceed 2,000 mm, while adjusting the voltage between the bands continuously, and without exceeding a 15V pitch voltage for larger sizes.

But the invention will be understood better by the following description of certain embodiments given for exemplification purposes and represented on the appended drawings.

Figure 1:
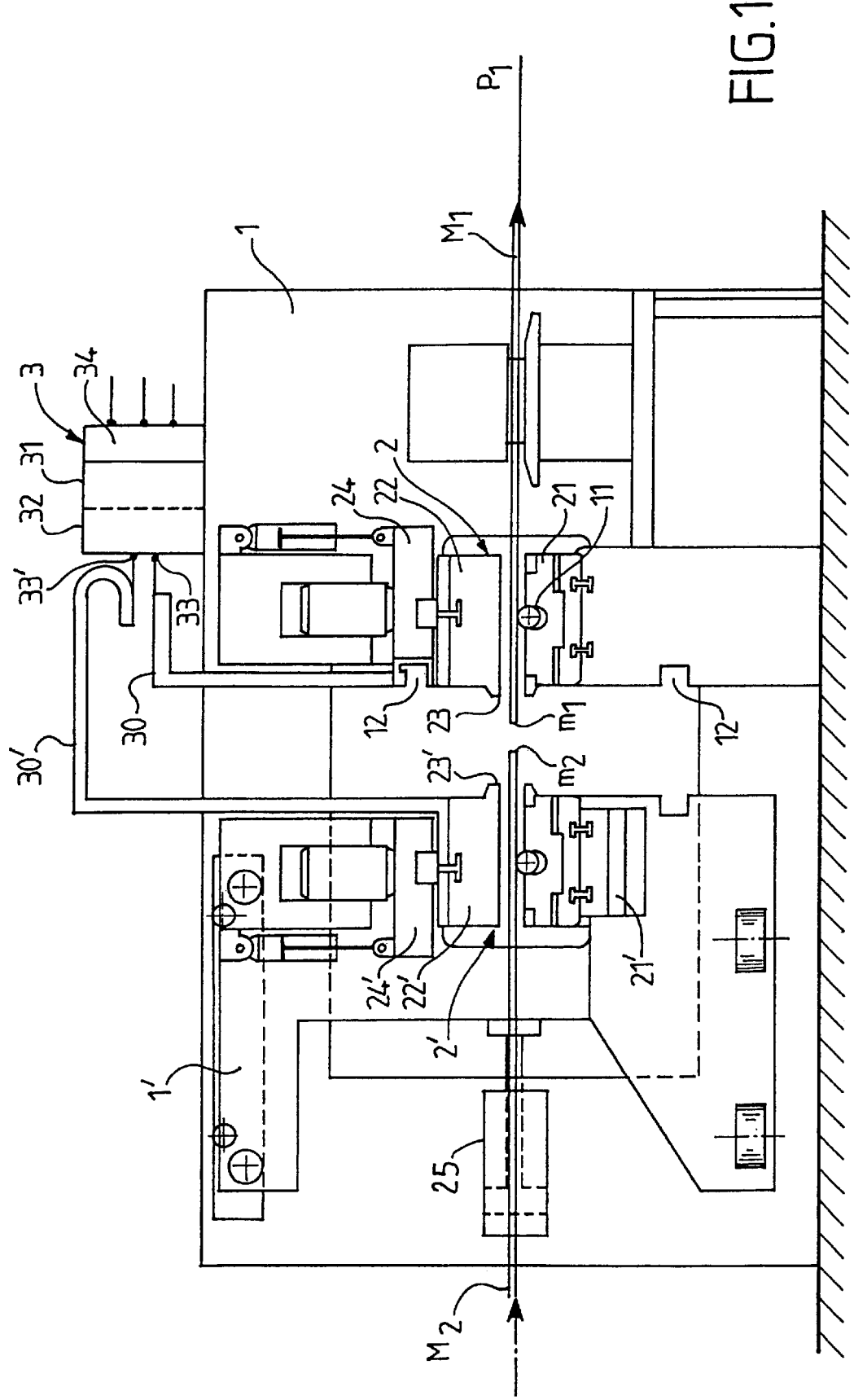
FIG. 1 is an elevated schematic view of a welding installation.

FIG. 1 is a diagrammatic representation of a welding installation of the type described in the document A-0845309 already mentioned. Such an installation comprises a fixed frame 1 on which is mounted a first retaining member 2 fitted with two jaws 21, 22, for clamping the downstream end, in the running direction, of a first band M1 and a mobile frame 1' mounted to slide on the fixed frame 1, parallel to the running axis of the bands, under the action of hydraulic actuators 25 or other equivalent means. The mobile frame 2' carries a second retaining member 2' fitted with two jaws 21', 22' for clamping the upstream end of a second band M2 following the first M1.

In the position represented on FIG. 1, both bands M1, M2 are carried by rollers 11 that delineate the horizontal running plane P1, whereas the retaining members 2, 2' are open. For butt welding both bands, the said bands are clamped between the jaws of both retaining members 2, 2' and a shearing member, which is not represented, enables cutting perfectly parallel edges on the ends, respectively downstream and upstream of both bands M1, 2. For example, in the arrangement of the document EP-A-0845309, double shears consisting of two pairs of rotary blades are used. They move perpendicular to the running axis, while sliding on guiding sections 12 provided on the fixed frame 1. Such an arrangement enables accurate adjustment of the cantilever distances between each edge m1, m2 of a band and the ends 23, 23' of the clamping members 2, 2' that remain clamped, after shearing, on the bands M1, M2, whereas the mobile frame 1' is then jogged forward in order to bring the upstream edge m2 closer to the downstream edge m1 of the first band M1.

The welding voltage is then established between both metal sheets to be butted. To this end, both retaining members 2, 2' that are made of an electric conducting material and isolated from the remainder of the machine, are connected to electric supply means 3 by live bars 31, 31'.

As we know, welding properly speaking comprises three distinct phases: starting, flashing and forging. During starting, the metal sheets supplied with electric current are placed in contact with one another, by slow jogging of the mobile plate, less than 1 mm/s, in order to establish a stable spark regime. After a preset feed travel, the following phase, the "flashing" is triggered. During this second phase, the mobile plate is accelerated gradually to a controlled speed, in order to produce appropriate heating on both faces of the metal sheets to be butted. After a set travel, the following phase, 'forging' is initiated. Forging consists in diffusion welding of both metal sheets to be butted, by feeding the mobile plate forward suddenly, then stopping the mobile plate abruptly, after a set travel. Preferably, during and after forging, an electric current is established through the welded joint, in order to moderate the cooling speed of the sheet.

The machine represented on FIG. 1 enables to realise these three successive welding phases, but differs from the usual arrangements since the power supply source 3 is a direct current generator.

In a preferred embodiment, the direct current generator comprises a three-phase transformer 3 with a primary circuit 31 supplied with three-phase alternate current and a secondary circuit 32 connected, via a diode rectifier bridge, to two poles 33, 33' to which are plugged, respectively, the live power supply bars 30, 30' of both retaining members 2, 2' of the bands M1, M2. Besides, the generator 3 is associated with means 34 for continuous modulation of the voltage applied between both poles 33, 33'.

Figure 2:
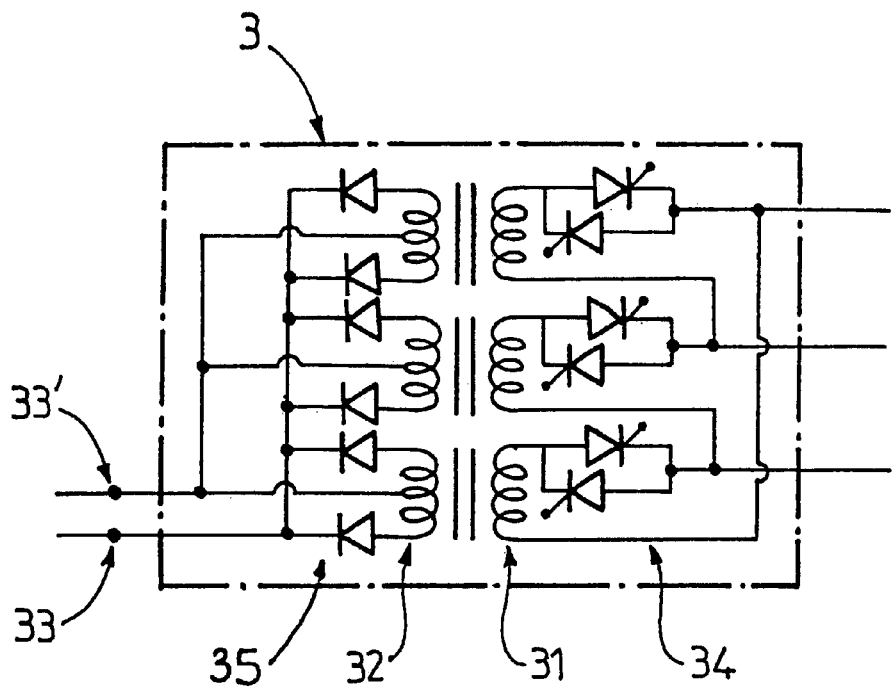
FIG. 2 is a diagram of a first embodiment of a power supply system of a direct power supply system.

FIG. 2 is a diagrammatic representation of such a direct current power supply circuit. The primary circuit 31 comprises three windings connected respectively to the three phases and mounted as a triangle, whereas each winding is power supplied by a pair of thyristors mounted head to foot and of the trigger-type, synchronous with the alternate current frequency. It is therefore possible to adjust a phase shift control that enables continuous modulation of the voltage at the terminals of the secondary circuit. The said secondary circuit may consist of three windings connected to both power supply poles 33, 33' by a Graetz bridge type six-phase rectifier bridge.

Figure 3:
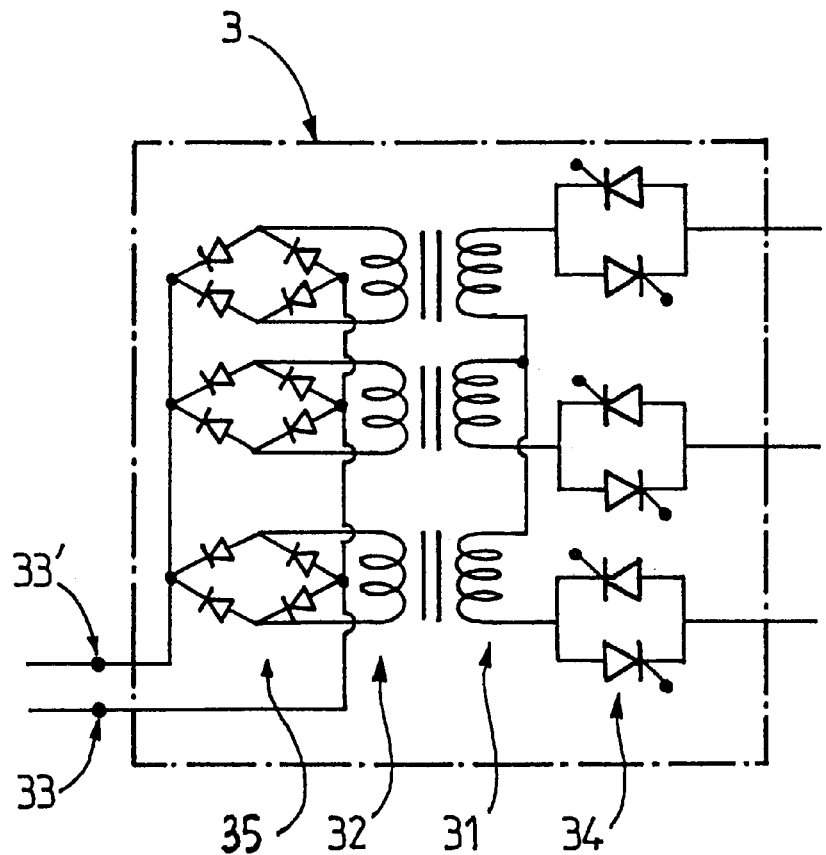
FIG. 3 is a diagram of another embodiment of the power supply system.

Other arrangements are, however, possible. For instance, on FIG. 3, the rectifier associated with the secondary circuit is a three-phase diode bridge mounted in double alternation. Moreover, the primary circuit may also be star-mounted as represented on FIG. 3.

Thanks to this arrangement, it is possible to adjust with accuracy the voltage applied in relation to the section of the metal sheets to be welded, in order to ensure regular formation of the sparks, even in case of variation in the section. Generally speaking, the thickness of the metal sheets to be welded may range from 0.8 mm to 8 or 10 mm, their width from 450 mm to 2100 mm, for instance. For such sizes, the voltage applied that is used for welding, may range between 4 and 13 volts.

Such a direct current power supply exhibits numerous advantages.

First of all, it enables reduction of the voltage applied to the jaws, for a given energy discharged when contacting both metal sheets during welding. Consequently, oxidation of the welding point is minimised which, in alternate current, depends on the peak voltage between the sheets.

Indeed, in flash welding, the current producing the heating resulting from a Joule effect is established between the facing edges of both metal sheets, by elementary short-circuit 'bridges' that melt instantly while emitting sparks. According, the global heating produced by a Joule effect is the addition of these elementary bridges that each depends on the instant value of the current and of the voltage.

In alternate current, there are several tens of bridges and sparks per period and an important proportion of these bridges will therefore take place for a voltage value notably higher than that of the efficient value, which increases the oxidation risk of the joint, in particular for certain metals. These excessive voltages cause, moreover, large dimples thereby affecting the quality of the joint.

Conversely, when the machine is power supplied, according to the invention, with direct current, all the sparks are generated under the same voltage and the said voltage can hence be reduced.

Still, using direct current, which calls for rectifiers, might increase the complexity and the space requirements of the equipment, the more so because the components need then to be cooled. However, the evolution of technology and, in particular, the components now available, enables remedying these shortcomings.

In addition to that, with respect to alternate current power supply, it is not so important to reduce the impedance of the power supply circuit of the welding jaws.

Thus, whereas the impedance calculated at 50 Hz of a welding machine power supplied with alternate current must remain smaller than 70 micro-ohms, impedances calculated at 50 Hz that are greater than 100 micro-ohms are acceptable with a direct current power supply such as that described above since the detrimental effect of the reactive portion of the inductance onto the welding process is vastly reduced. This advantage enables adopting constructive arrangements that are better suited to the power supply bus bars, the welding transformers and the geometry of the various elements of the welding machine.

In particular, the power supply means 3 can be located at the most adequate place, for example on the upper portion of the fixed frame 1 where larger space requirements are admissible. Moreover, the cooling process is easier.

Besides, rectified three-phase current power supply with reduced voltage that can be modulated, enables better control of the regular formation and fineness of the sparks and, thus, reduction of the burrs and other defects at the interface of the welded metal sheets.

Similarly, it is possible, while injecting a modulated continuous current into the welded joint, to ensure efficient control of the slow cooling process of the welded metal sheets, to avoid the risks of embrittlement.

The reference signs inserted after the technical features mentioned in the claims solely aim at facilitating the understanding of the said and do not limit their extent whatsoever.

What is claimed is:

1. An installation for flash butt welding of metal bands running successively along a longitudinal axis on an average plane that is substantially horizontal, said installation comprising:

a fixed frame centred on a running axis of the bands and on which is mounted a first two-jaw retaining member for clamping a downstream end, in a running direction, of a first band;

a mobile frame centred on the running axis and movable parallel to said axis with respect to the fixed frame, wherein said mobile frame carries a second two-jaw retaining member for clamping an upstream end of a second band following the first band, said first and second band having facing parallel edges, respectively downstream and upstream, wherein each edge is shorn at a preset cantilever distance with respect to the corresponding clamping jaws;

means for controlling a displacement of the mobile frame toward the fixed frame in order to bring the edges of both bands closer to one another;

a direct current generator with two poles connected respectively to said first and second retaining members of the bands; and means for continuously modulating a voltage applied between the first and second retaining members, in order to ensure regular formation of sparks for flash butt welding of the bands, by modulating the voltage to account for various sizes of the bands in a transversal section and to account for a type of metals to be welded.

2. A welding installation according to claim 1, wherein both retaining members are power supplied with direct current under a voltage that does not exceed 15V.

3. A welding installation according to claim 2, wherein both retaining members are power supplied with direct current under a voltage that does not exceed 15 V.

4. A welding installation according to claim 1, wherein the direct current generator comprises a three-phase transformer having a secondary circuit with three windings connected via rectifier means to two poles and a primary circuit with three windings respectively supplied with three phase alternate current via pulse-controlled thyristor devices synchronous with the alternate current frequency to adjust a phase shift control enabling continuous modulation of the voltage between the two poles of the secondary circuit connected with said retaining members.

5. A welding installation according to claim 4, wherein the second circuits of the three-phase transformer are connected to both supply poles via a 'Graetz bridge' type six-phase rectifier bridge.

6. A welding installation according to claim 5, wherein both retaining members are power supplied with direct current under a voltage that does not exceed 15 V.

7. A welding installation according to claim 4, wherein both retaining members are power supplied with direct current under a voltage that does not exceed 15 V.

8. A welding installation according to claim 4, wherein the three windings of the secondary circuit are connected via a diode rectifier bridge to the two supply poles connected with the retaining members.

9. A welding installation according to claim 8, wherein the secondary circuits of the three-phase transformer are connected to both power supply poles via a 'Graetz bridge' type six-phase rectifier bridge.

10. A welding installation according to claim 9, wherein both retaining members are power supplied with direct current under a voltage that does not exceed 15 V.

11. A welding installation according to claim 8, wherein both retaining members are power supplied with direct current under a voltage that does not exceed 15 V.

* * * * *